(12) United States Patent
Scheidegger et al.

(10) Patent No.: US 12,100,117 B2
(45) Date of Patent: Sep. 24, 2024

(54) IMAGE STITCHING FOR HIGH-RESOLUTION SCANS

(71) Applicant: International Business Machines Corporation, Armonk, NY (US)

(72) Inventors: Florian Michael Scheidegger, Dietlikon (CH); Dhruti Nilesh Shah, Chavannes-pres-Renens (CH); Adelmo Cristiano Innocenza Malossi, Schönenberg (CH)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 17/201,159

(22) Filed: Mar. 15, 2021

(65) Prior Publication Data
US 2022/0292633 A1 Sep. 15, 2022

(51) Int. Cl.
*G06T 3/4038* (2024.01)
*G01S 19/01* (2010.01)
(Continued)

(52) U.S. Cl.
CPC .......... *G06T 3/4038* (2013.01); *G01S 19/01* (2013.01); *G06T 7/0002* (2013.01); *G06T 7/33* (2017.01);
(Continued)

(58) Field of Classification Search
CPC .......... G01S 19/01; G06T 2207/10032; G06T 2207/30184; G06T 3/4038; G06T 7/0002; G06T 7/33; G06T 3/4053
See application file for complete search history.

(56) References Cited

U.S. PATENT DOCUMENTS

| 7,064,783 B2 | 6/2006 | Colavin et al. |
| 7,317,558 B2 | 1/2008 | Chiba |

(Continued)

FOREIGN PATENT DOCUMENTS

| CN | 103390063 | * 11/2013 | ............ G06F 17/30 |
| EP | 2423871 B1 | 2/2012 | |

(Continued)

OTHER PUBLICATIONS

Adhikari, R. "Image-based Condition Assessment for Concrete Bridge Inspection," https://www.semanticscholar.org/paper/Image-based-Condition-Assessment-for-Concrete-Adhikari/8bc491445520f5291acff49a1b3710d8751d222d, Corpus ID 108138321, Published 2014, 236pgs.

(Continued)

*Primary Examiner* — Zhiyu Lu
(74) *Attorney, Agent, or Firm* — Yee & Associates, P.C.

(57) ABSTRACT

A computer-implemented method is disclosed for image stitching for a plurality of digital images of an infrastructure surface for defect detection. The method includes providing a plurality of partial digital images of an infrastructure surface. The method includes extracting global positioning system meta-data from data corresponding to the partial digital images. The method includes determining feature descriptions of features in the one or more partial digital images. The method includes executing a scheduled processing sequence for the partial digital images based on the extracted global positioning system meta-data including determining an affinity matrix using the feature descriptions of adjacent partial digital images to incrementally position each of the partial digital images such that an overview image of the infrastructure surface is produced by iteratively digitally stitching the plurality of partial digital images together.

20 Claims, 9 Drawing Sheets

(51) Int. Cl.
*G06T 7/00* (2017.01)
*G06T 7/33* (2017.01)

(52) U.S. Cl.
CPC ............... *G06T 2207/10032* (2013.01); *G06T 2207/30184* (2013.01)

(56) References Cited

U.S. PATENT DOCUMENTS

| | | | |
|---|---|---|---|
| 7,894,689 | B2 | 2/2011 | Liu et al. |
| 9,440,750 | B2 | 9/2016 | Lapstun et al. |
| 9,478,008 | B1 | 10/2016 | Adsumilli et al. |
| 10,656,096 | B2 | 5/2020 | Naderhirn et al. |
| 2008/0265166 | A1* | 10/2008 | Shekhar ............... G01T 1/1647 250/363.03 |
| 2014/0336928 | A1 | 11/2014 | Scott |
| 2015/0193982 | A1* | 7/2015 | Mihelich ............... H04W 4/026 345/633 |
| 2017/0010615 | A1* | 1/2017 | Tanaka .................... G06V 20/13 |
| 2017/0235018 | A1 | 8/2017 | Foster et al. |
| 2017/0308088 | A1* | 10/2017 | Sabe ..................... G08G 5/0086 |
| 2019/0026862 | A1* | 1/2019 | Chang ....................... G06T 7/33 |
| 2019/0236764 | A1* | 8/2019 | Lindsey ................... G06T 7/174 |

FOREIGN PATENT DOCUMENTS

| | | | | |
|---|---|---|---|---|
| EP | 3042356 | B1 | 7/2016 | |
| EP | 3372967 | A1 | 9/2018 | |
| JP | 2006119730 | A | 5/2006 | |
| JP | 2006253742 | * | 9/2006 | ............ G01C 21/00 |
| WO | WO2012/131151 | * | 10/2012 | ............ G03B 37/04 |

OTHER PUBLICATIONS

Akbar et al., "An evaluation of image-based structural health monitoring using integrated unmanned aerial vehicle platform," https://onlinelibrary.wiley.com/doi/abs/10.1002/stc.2276, Struct. Control Health Monit. 2018;e2276, ©2018 John Wiley & Sons, Ltd., 20 pgs.

Apple, "Panorama Stitcher Mini," https://apps.apple.com/ch/app/panorama-stitcher-mini/id1062350226?mt=12&ign-mpt=uo%3D4, printed Feb. 19, 2021, 3 pgs.

Blanco et al., "Artificial intelligence: Construction technology's next frontier," https://www.mckinsey.com/business-functions/operations/our-insights/artificial-intelligence-construction-technologys-next-frontier, Apr. 4, 2018, 10 pgs.

Brown et al., "Automatic Panoramic Image Stitching using Invariant Features," International Journal of Computer Vision, 74.1 (2007): 59-73.

Brown, "AutoStitch," matthewalunbrown.com/papers/ijcv2007.pdf, printed Feb. 19, 2021, 3 pgs.

David, "Best Photo Stitching Software for Making Programs | 2020 Edition," https://havecamerawilltravel.com/photographer/panorama-stitching-best-apps/, printed Feb. 19, 2021, 7 pgs.

Gigapan, "GigaPan Stitch Downloads," http://www.gigapan.com/cms/support/download-gigapan-stitch, printed Feb. 19, 2021, 1 pg.

Girshick, R., "Fast R-CNN," https://openaccess.thecvf.com/content_iccv_2015/papers/Girshick_Fast_R-CNN_ICCV_2015_paper.pdf, Proceedings of the IEEE International Conference on Computer Vision (ICCV), 2015, pp. 1440-1448.

Hugin, "Hugin—Panorama photo stiticher," http://hugin.sourceforge.net/, printed Feb. 19, 2021, 4 pgs.

IBM, "Explore IBM—Artificial Intelligence," https://newsroom.IBM.com/Video-Meet-IBM-Maximo-for-Civil-Infrastructure, printed Feb. 19, 2021, 2 pgs.

IBM, "Maximo Visual Inspection—Overview," https://www.IBM.com/products/IBM-maximo-visual-inspection, accessed Feb. 19, 2021, 1 pg.

IBM, "Maximo Visual Inspection Mobile—Overview," Amplify your QA with computer vision on IOS, https://www.ibm.com/products/IBM-visual-inspector, printed Feb. 19, 2021, 1 pg.

Levin, et al. "Seamless image stitching in the gradient domain," European Conference on Computer Vision, https://www.researchgate.net/publication/2901457_Seamless_Image_Stitching_in_the_Gradient_Domain/ink/02bfe512645b18a881000000/download, Springer, Berlin, Heidelberg, 2004, 12 pgs.

Lowe, D. "Distinctive image features from scale-invariant keypoints," https://people.eecs.berkeley.edu/~malik/cs294/lowe-ijcv04.pdf, International journal of computer vision 60.2 (2004): 91-110.

Microsoft, "Image Composite Editor—Microsoft Research," https://www.microsoft.com/en-us/research/project/image-composite-editor/, printed Feb. 19, 2021, 2 pgs.

Mondal et al., "Autonomous vision-based damage chronology for spatiotemporal condition assessment of civil Infrastructure using unmanned aerial vehicle," http://www.techno-press.org/content/?page=article&journal=sss&volume=25&num=6&ordernum=8, Smart Structures and Systems, vol. 25, No. 6, Jun. 2020, pp. 733-749 (abstract only).

Photostitcher, "Download PhotoStitcher—Panoramic Image Stitcher," https://www.photostitcher.com/download.html, printed Feb. 19, 2021, 2 pgs.

PRNewswire, "IBM to Develop an AI-Powered IoT Solution to Help Clients Manage and Monitor Aging Bridges, Tunnels, Highways and Railways," https://newsroom.ibm.com/2019-04-24-IBM-to-Develop-an-AI-Powered-IoT-Solution-to-Help-Clients-Manage-and-Monitor-Aging-Bridges-Tunnels-Highways-and-Railways, Apr. 24, 2019, 3 pgs.

PTGui, "Create high quality panoramas," https://www.ptgui.com/, printed Feb. 19, 2021, 6 pgs.

Szeliski, "Image alignment and stitching: a tutorial." Foundations and Trends® in Computer Graphics and Vision, vol. 2, No. 1 (2006): 1-104.

Unknown, "OpenCV: Images stitching," https://docs.opencv.org/4.5.0/d1/d46/group_stitching.html, printed Feb. 19, 2021, 5 pgs.

You Tube, "IBM Virtual Insights: Accessible AI for Visual Inspection—Preview," https://www.youtube.com/watch?v=3tNEOSoAxSE, May 13, 2020, printed Feb. 19, 2021, 2 pgs.

You Tube, "IBM Visual Insights—how to create deep learning model," https://www.youtube.com/watch?v=NPxScGInHc0, May 26, 2020, printed Feb. 19, 2021, 2 pgs.

Zalama et al., "Road Crack Detection Using Visual Features Extracted by Gabor Filters," https://onlinelibrary.wiley.com/doi/abs/10.1111/mice.12042, Computer-Aided Civil and Infrastructure Engineering 29 (2014) 342-358.

Zhongyu et al., "Image alignment by piecewise planar region matching," https://ieeexplore.ieee.org/abstract/document/6874530, IEEE Transactions on Multimedia 16.7 (2014): 2052-2061.

Zomet et al., "Seamless image stitching by minimizing false edges," https://ieeexplore.ieee.org/abstract/document/1608144, IEEE Transactions on Image Processing, vol. 15, No. 4, pp. 969-977, Apr. 2006, doi: 10.1109/TIP.2005.863958.

\* cited by examiner

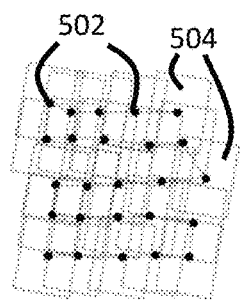
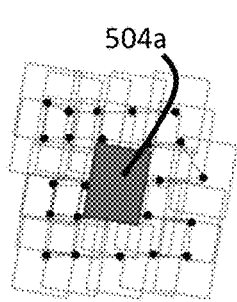
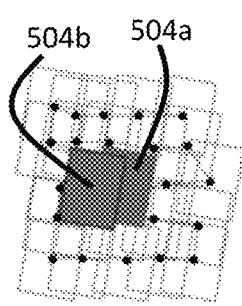
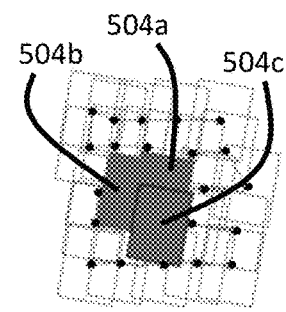
Fig. 5A  Fig. 5B  Fig. 5C  Fig. 5D
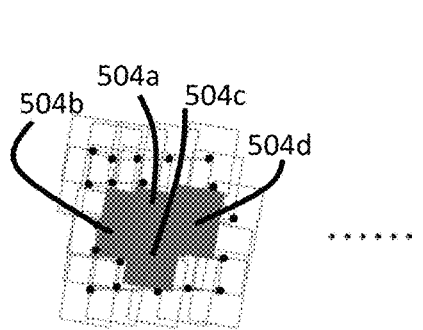
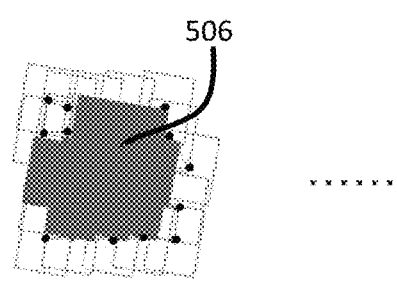
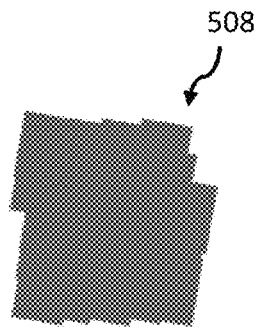
Fig. 5E  Fig. 5F  Fig. 5G

IMAGE STITCHING FOR HIGH-RESOLUTION SCANS

BACKGROUND

The disclosure relates generally to a method for image stitching for a plurality of digital images, and more specifically, to a computer-implemented method for image stitching for a plurality of digital images of an infrastructure surface for defect detection. The disclosure relates further to an image stitching system for image stitching for a plurality of digital images of an infrastructure surface for defect detection, and a computer program product.

Civil infrastructure around the world is growing older and older and its reliability may become weaker over time. A continuous human-based manual inspection of civil infrastructure components such as, for example, buildings, bridges, roads, pipelines, power-grid towers, wind-based generators, solar-cell systems, dams, etc., is expensive and often also dangerous. Therefore, automated methods for monitoring the constructional health status of civil infrastructures have gained popularity in recent years. The availability of autonomous drones to easily access and scan the surfaces of walls, bridges or streets with high quality image material may facilitate assessing surfaces of a structure by locating, identifying, and rating defects, such as cracks, rust, or algae. However, the interpretation of the defect can be improved by reliance on, at least, a high-resolution close-up of the defect and a location and size to better rate the effect on the overall structure.

In order to seriously inspect large infrastructure components, one digital image of a surface is not sufficient. Indeed, a plurality of digital images of a larger surface area of interest may be required. This plurality of digital images needs to be mapped to each other in order to reconstruct an accurate overview image of the infrastructure component. Some known methods for trying to solve this problem are based on panoramic scenes created from single photographs. However, such methods are manually demanding and time-consuming and frequently result in inconsistencies. Unfortunately, such issues also arise in known technologies currently available for seamless mapping multiple digital images. Additionally, such known technologies may have disadvantages in terms of the accuracy and speed of a detection of features during the image stitching process, which may result in inaccuracies of potential detected defects.

Therefore, it is desirable to overcome the limitations of existing techniques of image stitching and to provide image stitching techniques for delivering accurate results for the use of civil infrastructure health monitoring based on definitive algorithmic improvements.

SUMMARY

According to one aspect of the present disclosure, a computer-implemented method for image stitching for a plurality of digital images of an infrastructures surface for defect detection may be provided. The method may comprise providing a plurality of partial digital images of an infrastructure surface. The method may comprise extracting global positioning system meta-data from data corresponding to the partial digital images. The method may comprise determining feature descriptions of features in the one or more partial digital images. The method may comprise executing a scheduled processing sequence for the partial digital images based on the extracted global positioning system meta-data including determining an affinity matrix using the feature description of adjacent partial digital images to incrementally position each of the partial digital images such that an overview image of the infrastructure surface is produced by iteratively digitally stitching the plurality of partial digital images together.

According to another aspect of the present disclosure, an image stitching system for image stitching for a plurality of digital images of an infrastructure surface for defect detection may be provided. The system may comprise a memory for storing program code portions, the memory being coupled to a processor, which, when executing the program code portions may enable the processor to receive a plurality of partial digital images of an infrastructure surface. The processor may further be enabled to extract global positioning system meta-data from data corresponding to the partial digital images. The processor, when executing the program code portions, may be further enabled to determine feature descriptions of features in the one or more partial digital images. The processor may be further enabled to execute a scheduled processing sequence for the plurality of partial digital images based on the extracted global positioning system meta-data including determining an affinity matrix using the feature descriptions of adjacent partial digital images to incrementally position each of the partial digital images such that an overview image of the infrastructure surface is produced by iteratively digitally stitching the plurality of partial digital images together.

The method and system disclosed herein for image stitching for a plurality of digital images of an infrastructure surface for defect detection may offer multiple advantages, technical effects, contributions and/or improvements.

For example, embodiments of the methods and systems disclosed herein may include using an innovative algorithm for estimating robust and precise transformation matrices of scans of planar services, for example, of civil infrastructure components.

Additionally, embodiments of the methods and systems disclosed herein may use global positioning system (GPS) data for an initial placement of the partial digital images to define an error-resilient processing order. For example, in accordance with at least some embodiments of the present disclosure, GPS data may be used to define a schedule for processing the partial digital image. In such embodiments, the disclosed methods and systems facilitate computational speed because they may be scaled linearly with the number of images. Accordingly, in such embodiments, results may be better than those achieved using traditional techniques, for example, techniques including little or no non-overlapping zones in the overview image. This may mainly be based on the combined usage of GPS coordinates together with visual alignments, because purely visual approaches often have difficulties aligning images that have similar, repetitive, homogenous structures, like dozens or hundreds of identical windows in a tall building.

Furthermore, embodiments of the methods and systems disclosed herein may be resilient against impacts due to outlier images that may be present in the plurality of partial digital images captured. Such outlier images may occur if a camera on a flying object, such as a drone, is used. For example, a camera may be out of focus or may not have a viewing angle that is perpendicular to the surface. For example, if there are obstacles visually blocking portions of the surface, the camera may not be able to orient itself to have a viewing angle that is perpendicular to the surface. Additionally, reflections may occur on the captured digital surface or a lowering caused by the camera movement may occur. Embodiments of the methods and systems disclosed herein may be resilient to all of these problems and may self-correct such errors.

The resiliency against outlier images which might occur during the capturing of the partial digital images may mainly be addressed by aspects of feature detection, feature matching, and transformation matrix estimation in accordance with at least some embodiments of the methods and systems disclosed herein. Additionally, embodiments of the methods and systems disclosed herein may include verification, which may check properties of the estimated matrix in order to accept or discard it.

To determine the processing schedule, which may also be referred to as the stitching sequence, for a fast accumulative stitching, embodiments of the methods and systems disclosed herein may rely on the fact that images with a small Euclidean distance between GPS positions may have a high overlap. Furthermore, in embodiments of the methods and systems disclosed herein, the start of the stitching process follows a heuristic approach in that it starts in the middle or center (for example, from a GPS-based context) of the plurality of captured partial digital images of a specific scene. This strategy may provide the most natural view and may minimize potential error propagation paths.

Additional embodiments of the present disclosure, which are applicable for methods as well as for systems disclosed herein may facilitate additional benefits.

According to one optional embodiment, the method may also comprise rendering the overview image, and mapping at least one identified defect, at least one annotation, or at least one measurement onto the overview image. The defects may be detected by, for example, a neural network system, such as a deep neural network, according to various methods. Based on this, related annotations or measurements determined from detected elements in the overview image may also be shown as an overlay to the overview image. As an example, a size of a defect, or a number of defects (for example, per area), or an average distance between defects of a predetermined size, may be determined and also displayed in the rendered overview image.

According to one optional embodiment, the method may also comprise performing at least one of scene registration, image warping (or de-warping), and pixel-use comparisons for a time-evolution assessment, for a plurality of partial digital images of the infrastructure surface having different timestamps. This feature may facilitate determining evolutionary changes of defects and/or cracks in civil infrastructure elements. The scene registration and additional activities in this context may be better suited than single image comparisons such as those performed by traditional technologies.

According to another optional embodiment, the method may also comprise generating the plurality of partial digital images using a camera of an unmanned, uninhabited vehicle. Such embodiments facilitate capturing tall building facades or bridge pillars, for example, over a river. The unmanned, uninhabited vehicle (for example, UAV) may be an unpiloted aerial vehicle, a drone, a helicopter, a model airplane, a zeppelin, a balloon, a camera mounted on a vehicle sliding along a surface, such as a lift for building cleaning, or similar. However, it should be possible to maneuver the UAV by remote control or an automatic control and positioning system.

According to another optional embodiment, determining feature descriptions may include using a SIFT (scale-invariant feature transformation) method. This method may be used to determine local features in images. Accordingly, if different captured images are generated at different viewing angles, the local feature may still be detectable and matched if visible in different, in particular, partially overlapping, images.

According to another optional embodiment, determining feature description(s) may include detecting at least one point of interest in a captured partial image. In such embodiments, the SIFT method may be supported and the stitching process may be accelerated.

According to another optional embodiment, determining the affinity matrix may include using a RANSAC method (for example, the known random sample consensus) to incrementally position each of the partial digital images. The RANSAC method is a robust estimation procedure that may use a minimum set of randomly sampled correspondences in the images to estimate image transformation parameters, and find a solution that has the best consensus whether the existing data, for example, the captured partial images, may be matching.

According to another optional embodiment, incrementally positioning each of the partial digital images may comprise determining a transformation matrix $H_i$ to stitch a current partial digital image $I_i$ to an already existing intermediate stitched image $S_i$. In such embodiments, the already existing intermediate stitched image $S_i$ may be the result of previous iterations or cycles of image stitching of the captured partial digital images. Thereby, the general perspective transformation matrix may be a 3×3 matrix, while an affine transformation is a special case of perspective with the third row being [0, 0, 1]. The affine transformation matrix is a combination of rotation, shearing, translation, and scaling (further details are discussed below).

According to another optional embodiment, scheduling a processing sequence for the images may include sorting the partial digital images with an increasing distance (such as a Euclidean distance) from a central image of the infrastructure surface, and starting the incremental positioning of each of the partial digital images from the central image. This approach provides a more robust method for a solid stitching process which is more accurate than, for example, corner detector-based algorithms, because detector-based algorithms are not resilient to increased variations.

According to another optional embodiment, providing the partial digital images may include capturing the partial digital images at an angle that is parallel or nearly parallel to the surface of interest of the infrastructure. In other words, the viewing angle of the camera to the drone may be perpendicular or nearly perpendicular to the surface of interest. This may reduce the requirement of significant transformations, such as de-skewing, of the partial digital images before they may be used in the stitching process.

According to another optional embodiment, providing the partial digital images may include capturing the partial digital images such that the image plane is not in parallel to a captured surface, and digitally de-skewing the partial digital image so as to align the partial digital image in parallel with the captured surface. In such embodiments, it may also be possible to use digital images for which the viewing angle of the camera has not been perpendicular to the infrastructure surface, for example in instances where there was no clear sight of the surface due to a visual obstacle.

According to another optional embodiment, providing the partial digital images may include capturing the partial digital images on a virtual regular grid of the infrastructure surface. In such embodiments, the required transformation before stitching the partially digital images together to an overview image may be reduced. Therefore, optical inconsistencies in the final overview image may be reduced significantly or avoided altogether.

Furthermore, embodiments of the present disclosure may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the disclosure are described with reference to different subject matters. In particular, some embodiments are described with reference to method type claims, whereas other embodiments are described with reference to apparatus type claims. However, a person skilled in the art will gather from the above and the following description that, unless otherwise stated, in addition to any combination of features belonging to one type of subject matter, also any combination between features relating to different subject matters, in particular, between features of the method type claims, and features of the apparatus type claims, is considered to be disclosed within this document.

The aspects defined above and further aspects of the present disclosure are apparent from the examples of embodiments to be described hereinafter and are explained with reference to the examples of embodiments, to which the disclosure is not limited. Preferred embodiments of the disclosure will be described, by way of example only, and with reference to the following drawings.

FIG. 5A shows an image after performance of a portion of a process of stitching together the captured partial digital images, in accordance with embodiments of the present disclosure.

FIG. 5B shows an image after performance of a portion of a process of stitching together the captured partial digital images, in accordance with embodiments of the present disclosure.

FIG. 5C shows an image after performance of a portion of a process of stitching together the captured partial digital images, in accordance with embodiments of the present disclosure.

FIG. 5D shows an image after performance of a portion of a process of stitching together the captured partial digital images, in accordance with embodiments of the present disclosure.

FIG. 5E shows an image after performance of a portion of a process of stitching together the captured partial digital images, in accordance with embodiments of the present disclosure.

FIG. 5F shows an image after performance of a portion of a process of stitching together the captured partial digital images, in accordance with embodiments of the present disclosure.

FIG. 5G shows an image after performance of a portion of a process of stitching together the captured partial digital images, in accordance with embodiments of the present disclosure.

DETAILED DESCRIPTION

Figure 1:
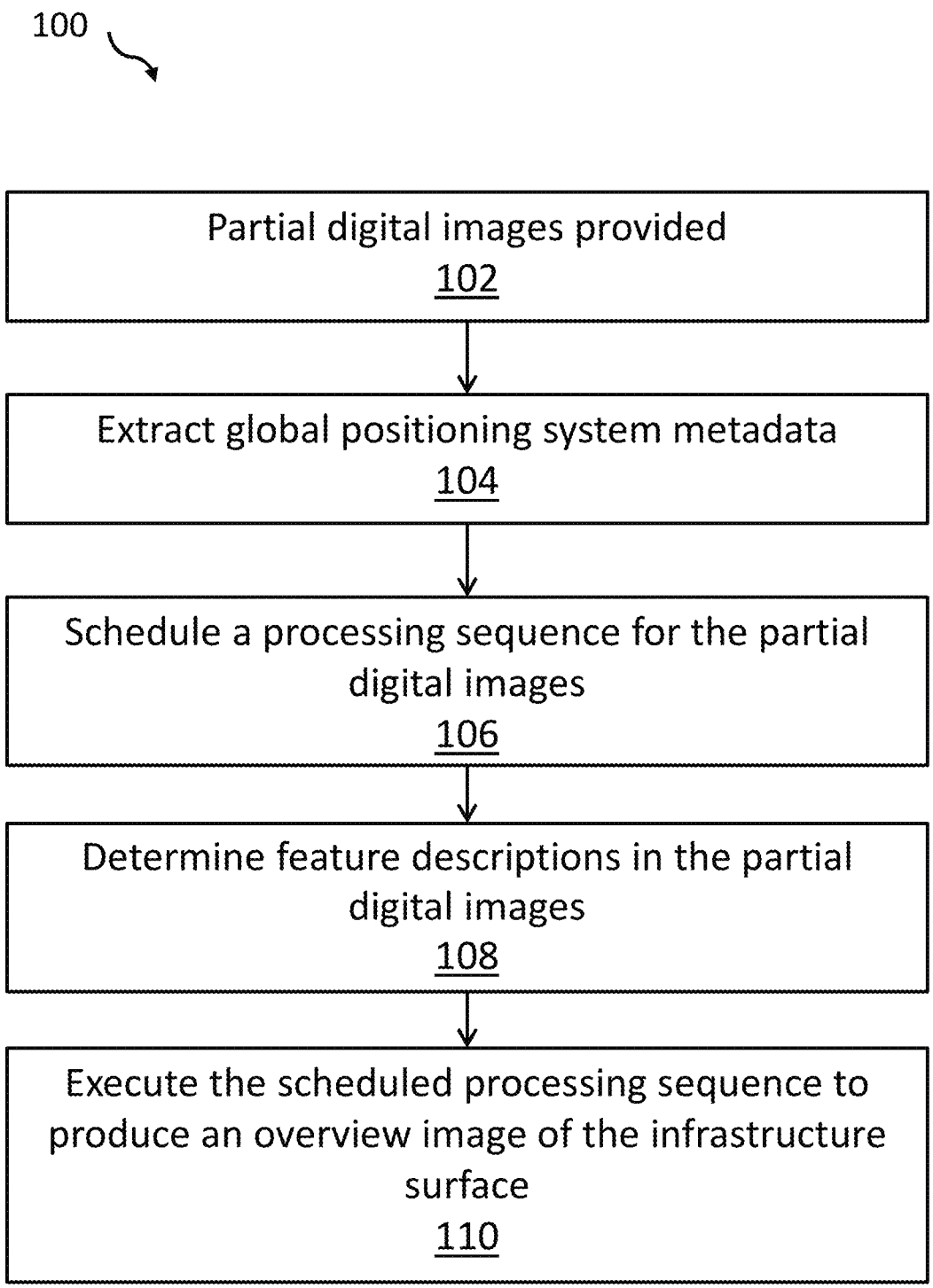
FIG. 1 depicts a block diagram of an embodiment of a computer-implemented method for image stitching for a plurality of digital images of an infrastructure surface for defect detection, in accordance with embodiments of the present disclosure.

In the context of this description, the following conventions, terms, and/or expressions may be used:

The term "image stitching" may refer to a process of combining multiple photographic digital images with possibly overlapping areas to provide a segmented panorama or overview image in a high resolution form.

The term 'infrastructure surface' may refer to a surface of any man-made civil infrastructure, like buildings, bridges, pipelines, pillars for wind energy generators, pillars for cables for electrical energy transport, roads, and similar structures.

The term 'partial digital image' may refer to a digital image, for example a digital image captured by a digital camera of an unmanned flying object, which may be stitched together with other images to build an overview image having a resolution that is the same as or similar to the partial digital image.

The term 'global positioning system' (GPS) may refer to the global satellite-based radio navigation system which is based on a global navigation satellite system (GNSS) to provide geolocation and time information to a GPS receiver. The GPS receiver may be part of the camera capturing the partial digital images so that the GPS data, for example latitude data, longitude data, and height data (also referred to as altitude data), may be integrated as meta-data into the data set of the captured digital image.

The term 'processing sequence' may refer to the process to determine according to which rules the partial digital images are processed and stitched together. The stitching process may in particular start at a start image, which may be in the middle of the overview image which should be produced. Further images to be stitched to the start image follow the rule of a growing distance to the central image. After two or more images have been stitched together, they may be denoted as an "intermediate image."

The term 'feature description' may refer to specific markers used to identify detected features in a digital image.

The term 'affinity matrix' may refer to a mathematical matrix in which related features in adjacent digital images may be related to each other so that during the stitching process these related features overlap in a seamless way.

The term 'overview image' may refer to the plurality of the captured partial digital images which have been stitched together in a seamless way according to the method and system disclosed herein. Thereby, the overview image may have the same resolution (e.g., pixels per inch) as each of the partial digital images.

The term 'identified defect' may refer to inconsistencies, mechanical or otherwise, in the digitally captured image(s). Such defects may relate to cracks or other problematic areas in a civil infrastructure component that may, sooner or later, be a cause for defective function of the related infrastructure component. To identify the defects, a variety of trained neural networks systems may use one or more of the captured partial digital images as input.

The term 'scene registration' may refer to a registration of a produced overview image out of the plurality of captured partial digital images which have been stitched together. The registered scene at a specific time (in particular, a time having a timestamp X) may be used as a reference for a comparison with another scene at a later time (in particular a later time having a timestamp Y).

The term 'image warping' may refer generally to the process of digitally manipulating a digital image. Shapes and forms portrayed in the image undergo one or more transformations and may thus be distorted significantly if compared to the captured image. The term 'image de-warping' may be used herein to refer to a transformation of an image, which may not have been captured under ideal conditions, such that the viewing angle will be perpendicular to the captured surface.

The term 'pixel-use comparison' may refer to a comparison process of digital images using techniques based on a comparison of corresponding pixels in the digital images.

The term 'SIFT' may refer to the known feature detection algorithm to detect and describe local features and an image. The abbreviation SIFT stands for scale-invariant feature transformation. This technique may be useful for object-recognition and, in particular, for image stitching. SIFT key points of objects may firstly be extracted from a set of reference images and stored in a database. Later, an object may be recognized in a new image by individually comparing each feature from the new image with the images in the database and finding candidates matching features based on the Euclidean distance of their feature vectors. As an example, a 128 float value vector may be used here.

The term 'transformation matrix' may refer to a matrix in the mathematical sense used to transform another matrix into another representation. For example, a transformation matrix may be used to transform a matrix describing a digital image or part thereof into another representation.

A detailed description of the figures is provided herein. All instructions in the figures are schematic. Firstly, a block diagram of an embodiment of a computer-implemented method for image stitching for a plurality of digital images of an infrastructures surface for defect detection is given. Furthermore, additional embodiments, as well as embodiments of the image stitching system for image stitching for a plurality of digital images of an infrastructures surface for defect detection, are described.

Before proceeding with the detailed description of the present disclosure, the general concept underlying the disclosure is described below.

Firstly, a substantially planar and stationary surface, which is a surface of interest, is assumed to be captured as a plurality of digital images. Overall complex structures are decomposed into multiple simple scenes. For example, each face of rectangular bridge pillars or pylons is treated individually. Primitive elements, such as building fronts, wards, and street surfaces are simple examples of faces. Each face generally defines a plane of interest in which the face is considered to lie. During the scanning process, a flying object, for example, a drone, moves along a parallel plane so as to keep the heading of the camera facing the plane of interest in a perpendicular manner.

The mission planning is performed such that the drone's path is controlled along a regular grid pattern to scan the surface of interest. The images are captured at regular intervals and are automatically correlated with GPS metadata that is enhanced with a real-time kinematic technique (ITK) relying on a reference base station signal. The raw images with the GPS annotations are the only input data considered for the subsequence processing.

The image sensor resolution and the distance of the drone from the surface of interest determine the ground sampling distance. The mission planning ensures a minimal target ground sampling distance. Since the drone is moving during the image capturing, the flight speed may be limited to limit the maximum image sensor exposure to minimize the motion blur visible in the collected data. For example, the flight speed may be limited to 0.4 meters per second or a similar speed.

For the feature matching, at iteration i, feature matching is performed between an intermediate stitched image $S_i$ and a corresponding current image $I_i$. Features of the considered pair of images may be matched by, for example, the following procedures. In accordance with at least some embodiments of the present disclosure, a k-NN matching algorithm with k=2 corresponding to each feature of the top two features from $S_i$ based on the Euclidean distance between the features may be used. Additionally, the Lowe's ratio test may be used to prune false positive matches.

In a further operation, using the matches of the previous operation, an estimation of an affine transformation matrix to transform $I_i$ into the accordion at system of $S_i$ is performed. In accordance with at least one embodiment of the present disclosure, the RANSAC (random sample consensus) algorithm can be used to perform this operation. RANSAC is a robust estimation procedure that uses a minimal set of randomly sampled correspondences to estimate image transformation parameters and find a solution that has the best consensus with the data. It removes outliers and returns the best transformation matrix. At least three non-collinear points may need to be matched to be able to estimate the fine transformation matrix.

A general perspective transformation matrix is a 3×3 matrix, while an affine transformation matrix is a special case of perspective, with a third row being [0, 0, 1]. An affine transformation matrix is a combination of rotation, shearing, translation, and scaling which can be expressed as:

$$\begin{bmatrix} A_{11} & A_{12} & A_{13} \\ A_{21} & A_{22} & A_{23} \\ 0 & 0 & 1 \end{bmatrix} =$$

-continued $$\begin{bmatrix} \cos\theta & -\sin\theta & 0 \\ \sin\theta & \cos\theta & 0 \\ 0 & 0 & 1 \end{bmatrix} \cdot \begin{bmatrix} 1 & 0 & t_x \\ 0 & 1 & t_y \\ 0 & 0 & 1 \end{bmatrix} \cdot \begin{bmatrix} s_x & 0 & 0 \\ 0 & s_y & 0 \\ 0 & 0 & 1 \end{bmatrix} \cdot \begin{bmatrix} 1 & m_x & 0 \\ m_y & 1 & 0 \\ 0 & 0 & 1 \end{bmatrix}$$

wherein $\theta$ is the angle of rotation of the image, $t_x$ and $t_y$ are the translations, $s_x$ and $s_y$ are the scaling factors, and $m_x$ and $m_y$ are the shearing factors in the x and y directions, respectively.

Assuming an ideal setup, as described above, only translations among the images can be expected. Henceforth, the ideal transformation matrix is structured as follows:

$$\begin{bmatrix} 1 & 0 & t_x \\ 0 & 1 & t_y \\ 0 & 0 & 1 \end{bmatrix}$$

However, to account for drone and camera positioning distortions, rotations, shearing, and scaling up to a certain threshold are also allowed. Transformation exceeding the threshold values are marked as outliers and excluded from the further processing to avoid error propagation.

This technique is effective to remove some typical errors in single images, like being out-of-focus, having motion-blur, or key points leading to a wrong matching.

The figures are now described below in the context discussed above.

FIG. 1 depicts a block diagram of a preferred embodiment of the computer-implemented method 100 for image stitching for a plurality of digital images of an infrastructure's surface for defect detection. The plurality of digital images can originate from high-resolution regular scans of a surface of an infrastructure for defect detection. The infrastructure could be, for example, a building, a bridge, or another civil infrastructure. The plurality of digital images can also originate from scans for localization and evolution-based severity assessments. At operation 102 of the method 100, a plurality of partial digital images of an infrastructure surface are provided. In accordance with at least some embodiments of the present disclosure, the partial digital images also comprise GPS meta-data.

At operation 104, the method 100 further includes extracting the global positioning system meta-data from the data of the partial digital images. In accordance with at least some embodiments of the present disclosure, the meta-data is extracted from, for example, GPS or GNSS systems, like Galileo, Naystar, GLONASS or Beidou.

At operation 106, the method 100 further includes scheduling a processing sequence for the images based on the extracted global positioning system meta-data.

At operation 108, the method 100 further includes determining feature descriptions in the one or more partial digital images. In accordance with at least some embodiments of the present disclosure, the feature descriptions can be determined by using, for example, a 128 dimensional float vector from the SIFT method or other methods.

At operation 110, the method 100 further includes executing a scheduled processing sequence. By executing the scheduled processing sequence, an affinity matrix using the feature description of adjacent partial digital images can be determined to incrementally position each of the partial digital images. This way, step-wise, an overview image of the infrastructure surface can be produced by digitally stitching the plurality of partial digital images together.

Figure 2:
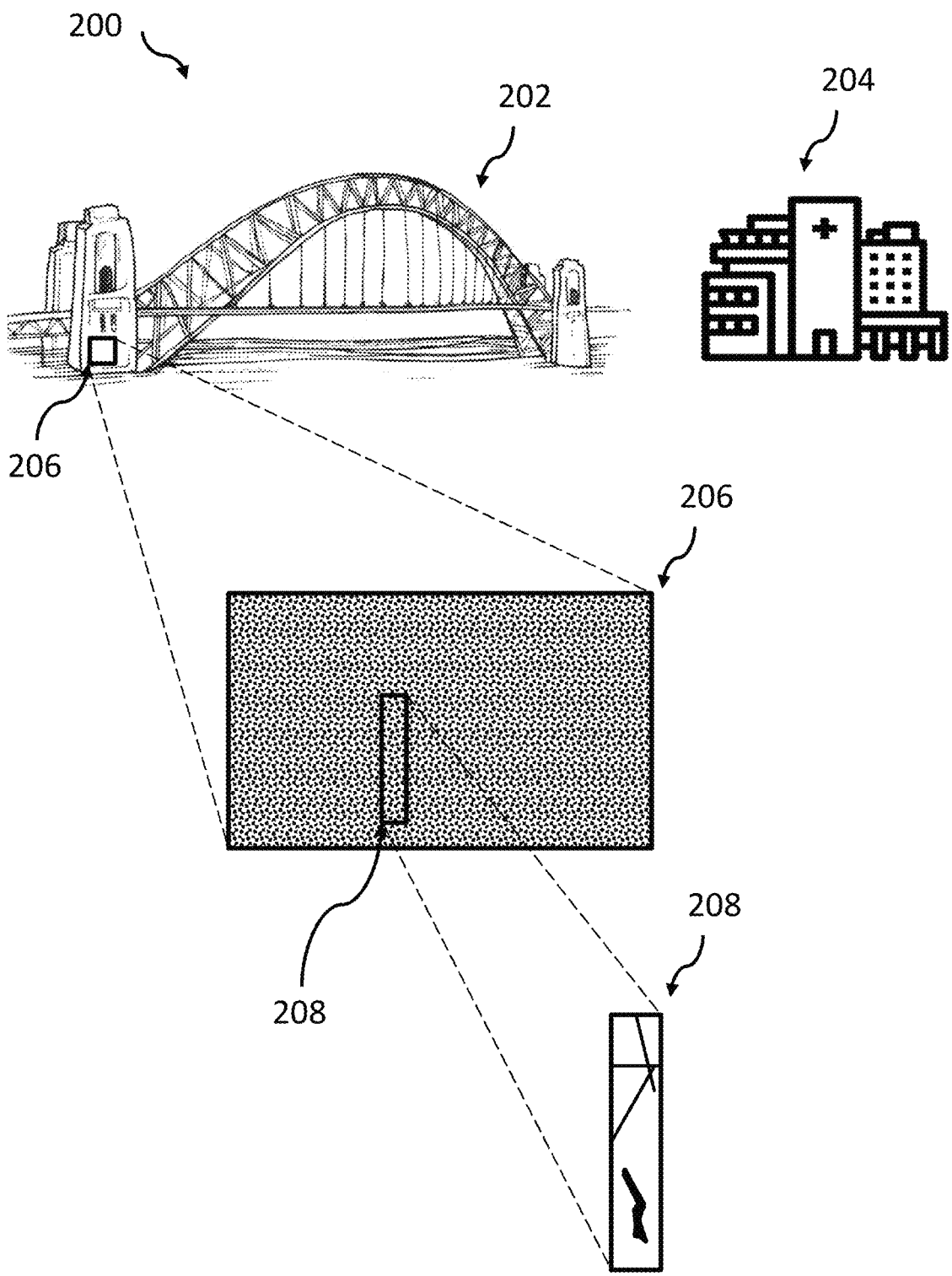
FIG. 2 depicts a schematic drawing of an embodiment of an implementation of the present disclosure, in accordance with embodiments of the present disclosure.

FIG. 2 shows a schematic drawing of an illustrative embodiment 200 of an implementation of the present disclosure. In the illustrative embodiment 200, the infrastructure object of interest may be a bridge 202, a building 204, a post for an electrical over-land cable, a pillar of a wind energy generator, or another similar structure. In accordance with the illustrative embodiment 200, a camera mounted on a flying vehicle may capture an image 206 having a given resolution. In this captured image 206, a certain area or sub-image 208 may be of greater interest because of potentially present damage, like small cracks, surface scratches, or similar defects. However, the resolution of the captured image may not be sufficiently high to enable identification of the areas of interest. Accordingly, the area of the image 206 is scanned to produce a plurality of partial digital images (not shown here).

In some implementations of the present disclosure, such as is the case in this illustrative example, up to four orders of magnitude of resolution must be spanned to accurately detect and localize a defect. For example, an area of interest of the bridge 202 may a width of approximately 10 meters. This area may be represented by an overview image 206 taken by a camera. However, the defect crack in that area of interest may have a width that is less than approximately 1 millimeter. Accordingly, the overview image 206 typically has a resolution that is too low to accommodate both the width of the area of interest (approximately 10 meters) and the width of the crack (less than approximately 1 millimeter).

Figure 3:
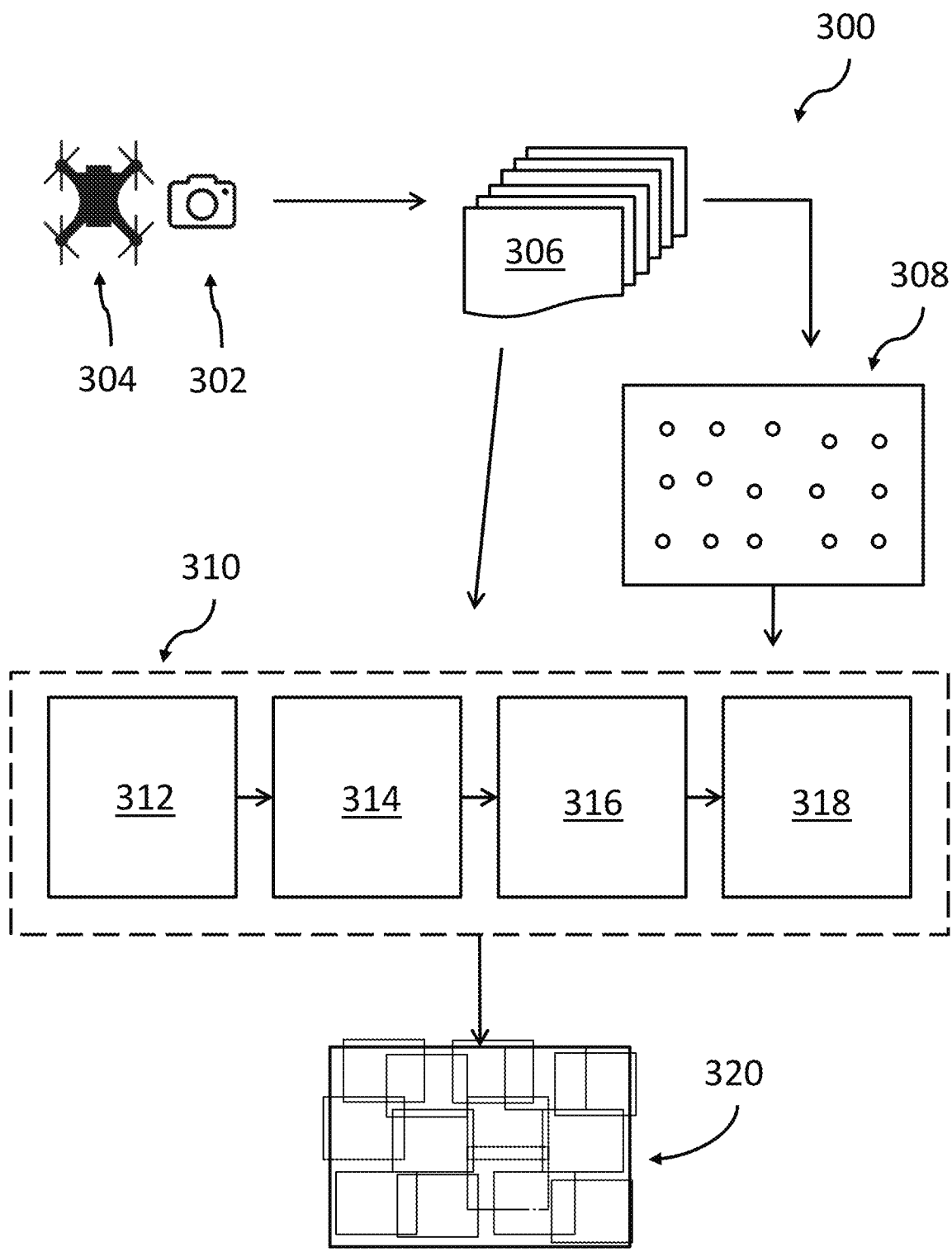
FIG. 3 depicts a schematic drawing of an overview of an implementation of the present disclosure, in accordance with embodiments of the present disclosure.

FIG. 3 shows a schematic drawing of an illustrative embodiment of an overview 300 of an implementation of the present disclosure. A camera 302 is mounted on a flying object 304, and the camera 302 can capture a plurality of partial digital images 306. In accordance with at least one embodiment of the present disclosure, the flying object 304 is a drone. Each digital image of the plurality of partial digital images 306 includes meta-data such as GPS data. GPS data includes coordinates such as latitude, longitude, and height (which may also be referred to as altitude). In accordance with at least some embodiments of the present disclosure, the meta-data for each digital image of the plurality of digital images 306 may also include a related timestamp. Using current technology, GPS data can be as precise as ±5 centimeters. However, this is not precise enough for high quality stitching of the partial digital images 306 to enable detection of infrastructure deficiencies.

Based on the captured images 306 and the GPS data, a stitching order 308 is determined. Subsequently, the captured images 306 as well as the stitching order 308 are used as input for the system 310 (implementing one or more algorithms), which includes a SIFT interest point detection and description 312, an interest point matching 314, a transformation matrix estimation 316, and a defect localization and/or measurement 318. The system 310 outputs a fully stitched image 320 rendered comprising defect localization and/or measurement data. The fully stitched image 320 may also be referred to as the produced overview image.

Figure 4:
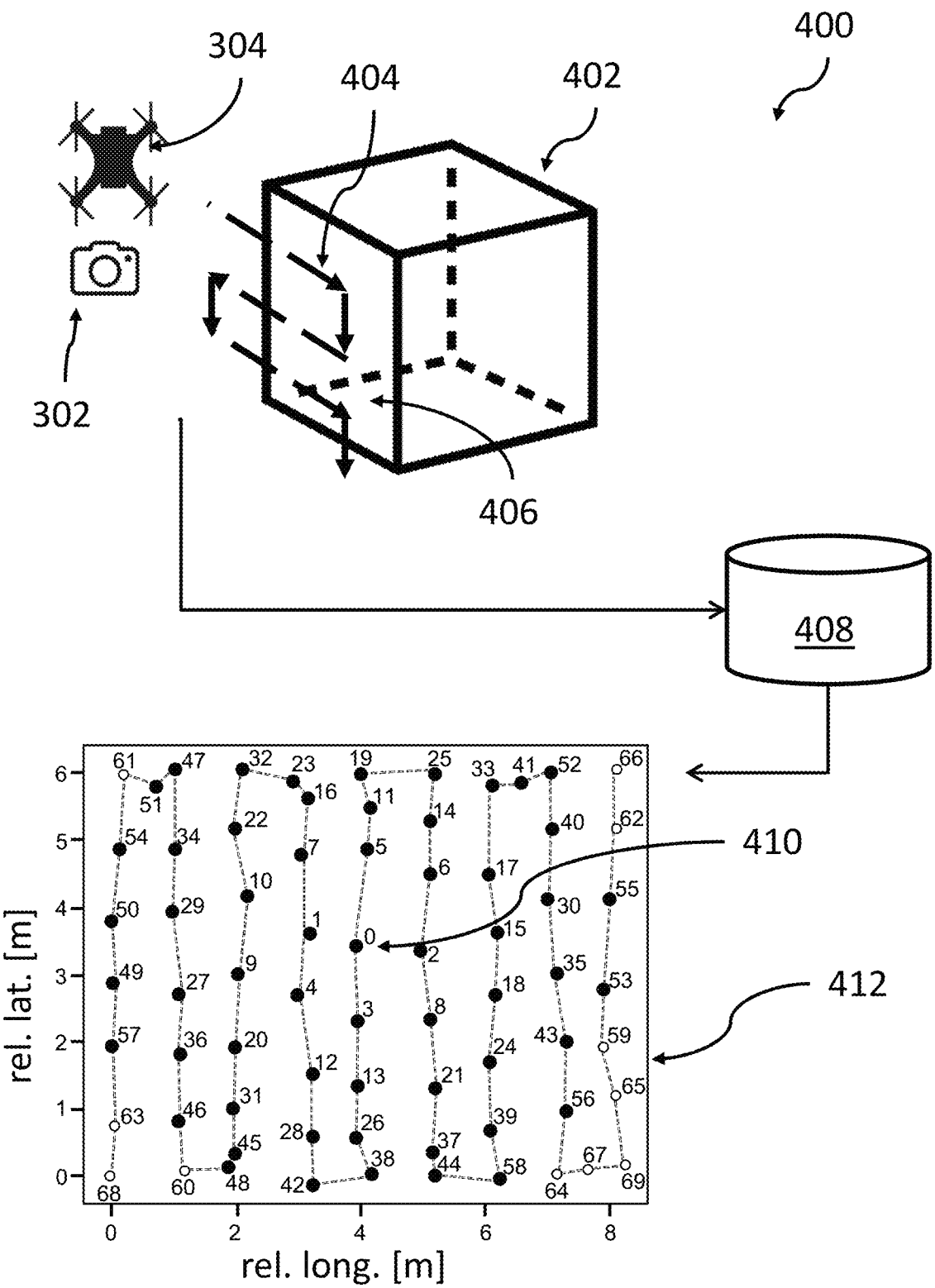
FIG. 4 depicts a schematic drawing of an illustrative embodiment for a movement of a camera and a sequence of images used for stitching, in accordance with embodiments of the present disclosure.

FIG. 4 shows a schematic drawing 400 of an illustrative embodiment for a movement of a camera and a sequence of images used for the stitching. In the diagram 400, the cube 402 can represent an illustrative object of interest, for example, a pylon of a bridge. The camera 302 of the flying object 304 may fly along a path 404 in front of a surface of interest 406 of the pylon. Assuming that the flying object 304 and the camera 302 are operated in a typical manner, the camera 302 captures images from within a relatively short distance of the pylon. In this illustrative embodiment, by capturing these images, the camera 302 provides the plurality of partial digital images, and this plurality of partial digital images is stored in a memory system 408.

Based on the GPS data that correlates to each of the captured images, a chart 412 may be formed wherein each image is represented by a dot. In accordance with at least some embodiments of the present disclosure, the chart 412 is oriented such that relative longitudinal position is on the x-axis and relative latitudinal position is on the y-axis, and the dots are organized on the chart 412 in a manner which represents their positions relative to one another. In the context of the chart 412, the partial digital images are sorted according to an increasing geometrical distance from a central image 410, which is determined to be at or near the middle or center of the overview image. The geometrical distance may also be referred to as the physical distance or the geolocational distance.

In accordance with at least some embodiments of the present disclosure, the dots representing the images may be connected by a line, which may indicate the sequence in which the images were captured. In accordance with at least some embodiments of the present disclosure, the dots representing the images may be labeled with numbers adjacent to the dots. In such embodiments, the numbers may represent the determined or scheduled sequence of the stitching process. As may be indicated by FIG. 4, in accordance with at least some embodiments of the present disclosure, the sequence in which the images are captured and the sequence in which the images are stitched together to the produced overview image is typically not the same.

FIGS. 5A-5G illustrate a series of results of the performance of various operations of the herein described process of stitching the captured partial digital images together. In FIG. 5A, each of the dots 502 represents a reference point (for example, the center, top left corner, middle of top boarder, or the like) of a corresponding one of the captured partial digital images 504, based on the GPS meta-data. However, in FIG. 5A, the images 504 are only loosely positioned, because the GPS meta-data are not precise enough for proper matching and stitching.

As already mentioned in the context of FIG. 4, the stitching process starts in the middle. This is illustrated in FIG. 5B, wherein the central image 504a is highlighted. As shown in FIG. 5C, a second partial image 504b is stitched to the left side of the central image 504a, which was the first image addressed in FIG. 5B. As shown in FIGS. 5D and 5E, additional images 504c and 504d are added. At each iterative step, until all available partial digital images have been stitched together, the number of partial digital images that have been stitched together may be referred to as a "so-far" intermediate stitched image or an "in-progress" intermediate stitched image. Such intermediate stitched images may be referred to herein with the indicator "$S_i$".

FIG. 5F illustrates the result of the iterative progress of the stitching process after more partial digital images have been stitched to the intermediate stitched image 506. FIG. 5G illustrates the result of all available partial digital images having been stitched together to produce the overview image 508 as a result of the process described herein.

Figure 6:
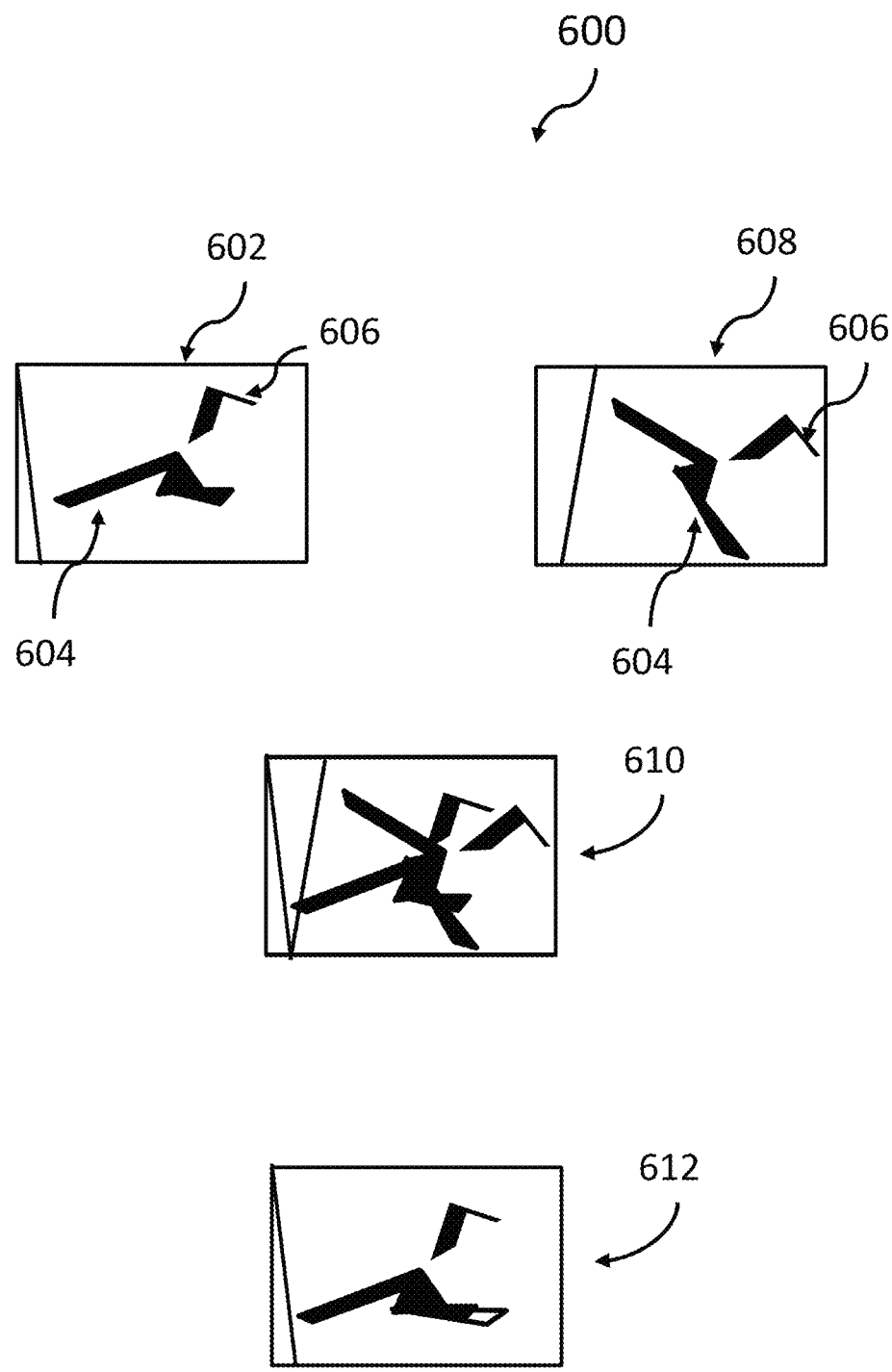
FIG. 6 shows an illustrative example of captured images that are time dependent and compared in single image mode, in accordance with embodiments of the present disclosure.

FIG. 6 illustrates a flow 600 of captured images that are correlated with data representing the time at which they were captured as well as the three dimensional spatial conditions in which they were captured. In this illustrative example, the image 602 was captured with a timestamp X and shows a defect 604 in a surface, as well as another artifact 606 in the surface. Image 608 was captured with a timestamp Y, which is later then timestamp X. The recognized defect 604 has changed in image 608 relative to image 602. The viewing angle of the images is also different. More specifically, the viewing angle of image 608 is rotated clockwise relative to the viewing angle of image 602. Additionally, the right tail of the defect 604 is larger in image 608 than in image 602. In contrast, the artifact 606 seems to be unchanged in image 608 relative to image 602.

For the purpose of this illustrative example, the elapsed time between timestamp X and timestamp Y is relatively large. In order to provide trustworthy assessments of infrastructure components, it is important to be able to observe defects or potential defects over a long period of time. The assessment of the evolution of a defect allows a better assessment of its severity. However, comparing cracks over a long period of time is difficult because snapshots of images of the same defect are required for multiple time-points, an accurate positioning is required, the same defect need to be compared, and accurate measurement of the crack changes are required. The simple solution of using a stationary camera for accurate observations is often not feasible since the scanned area is too large or the image material is stemming from a drone which may be difficult to assess.

Image 610 shows a result of the images 602 and 608 being overlaid on top of one another. Accordingly, image 610 enables a direct comparison, as well as an image registration, a warping (or de-warping), and finally a direct comparison. However, image registration may require highly-visible reference points which, without any markers, may be difficult to access. For example, concrete is a self-similar material, which makes it difficult to locate reliable matching points. Therefore, it may be difficult to achieve the desired result shown in image 612, which depicts a correct match.

Figure 7:
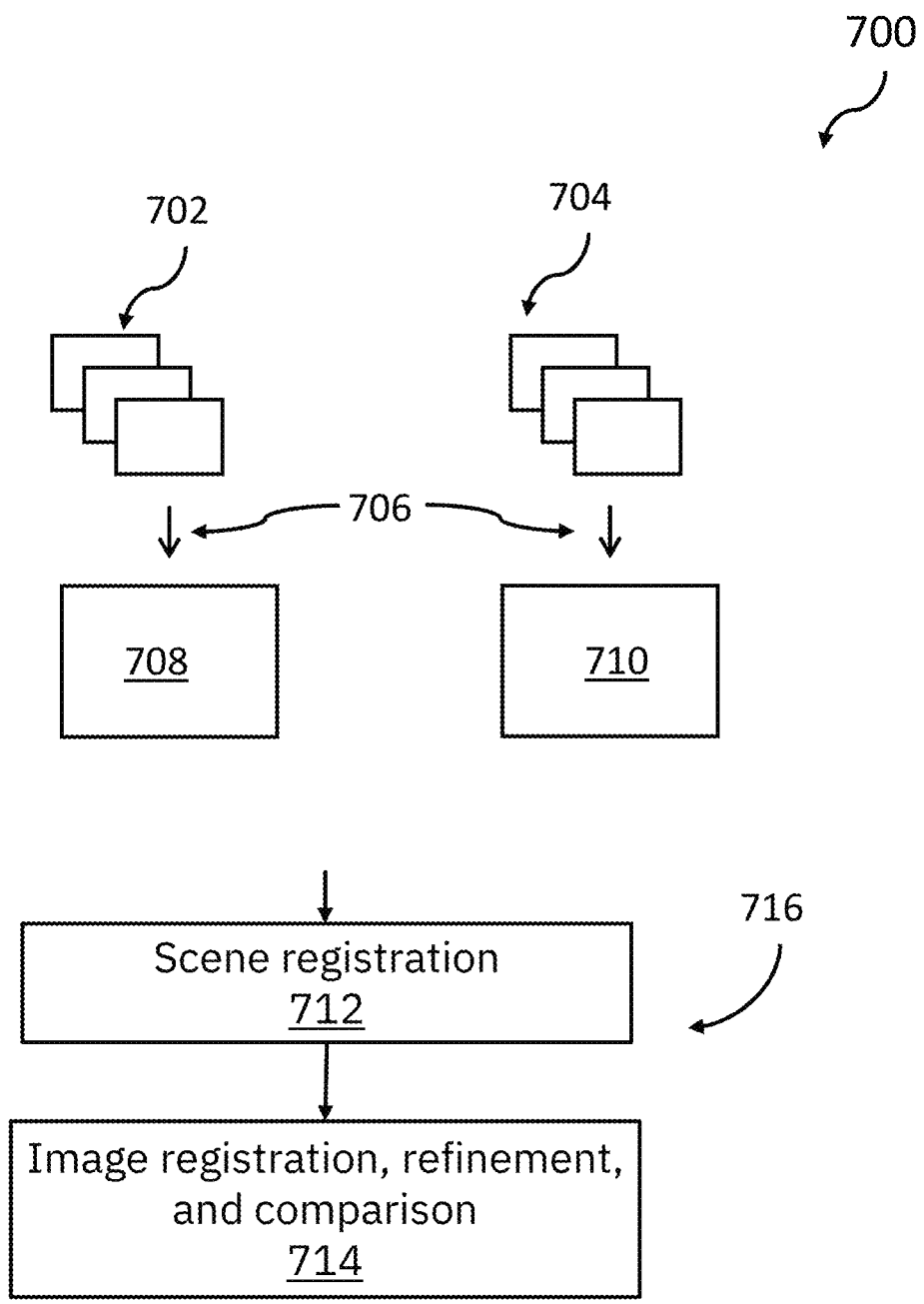
FIG. 7 depicts a block diagram of a plurality of captured images that use a scene comparison for determining an evolution of defects, in accordance with embodiments of the present disclosure.

Thus, for the method disclosed herein, instead of using a single image comparison, a scene comparison uses the image stitching procedures disclosed herein. To this end, FIG. 7 shows a related illustrative diagram 700.

In the diagram 700, the plurality of images 702 of a scene are captured at a first time, having a timestamp X, and the plurality of images 704 of the same scene are captured at a second time, having a timestamp Y. As discussed above, the timestamp Y occurs later than the timestamp X. At an operation 706, each of the sets of images of the same scene are stitched together, using the above-described method, resulting in the respective produced overview images 708 and 710.

The diagram 700 further includes a partial flow chart 716 which illustrates two operations to be executed using the overview images 708 and 710. First, at operation 712, scene registration is performed. Then, at operation 714, image registration, refinement, and comparison are performed. The technique illustrated in FIG. 7 results in a high quality assessment of a crack evolution, because the scene is likely to comprise highly-visible reference points (such as borders or lines), and the registered accuracy depends on the image stitching accuracy of each scene. Therefore, automatic detection of unique growing defects versus new defects is facilitated.

Figure 8:
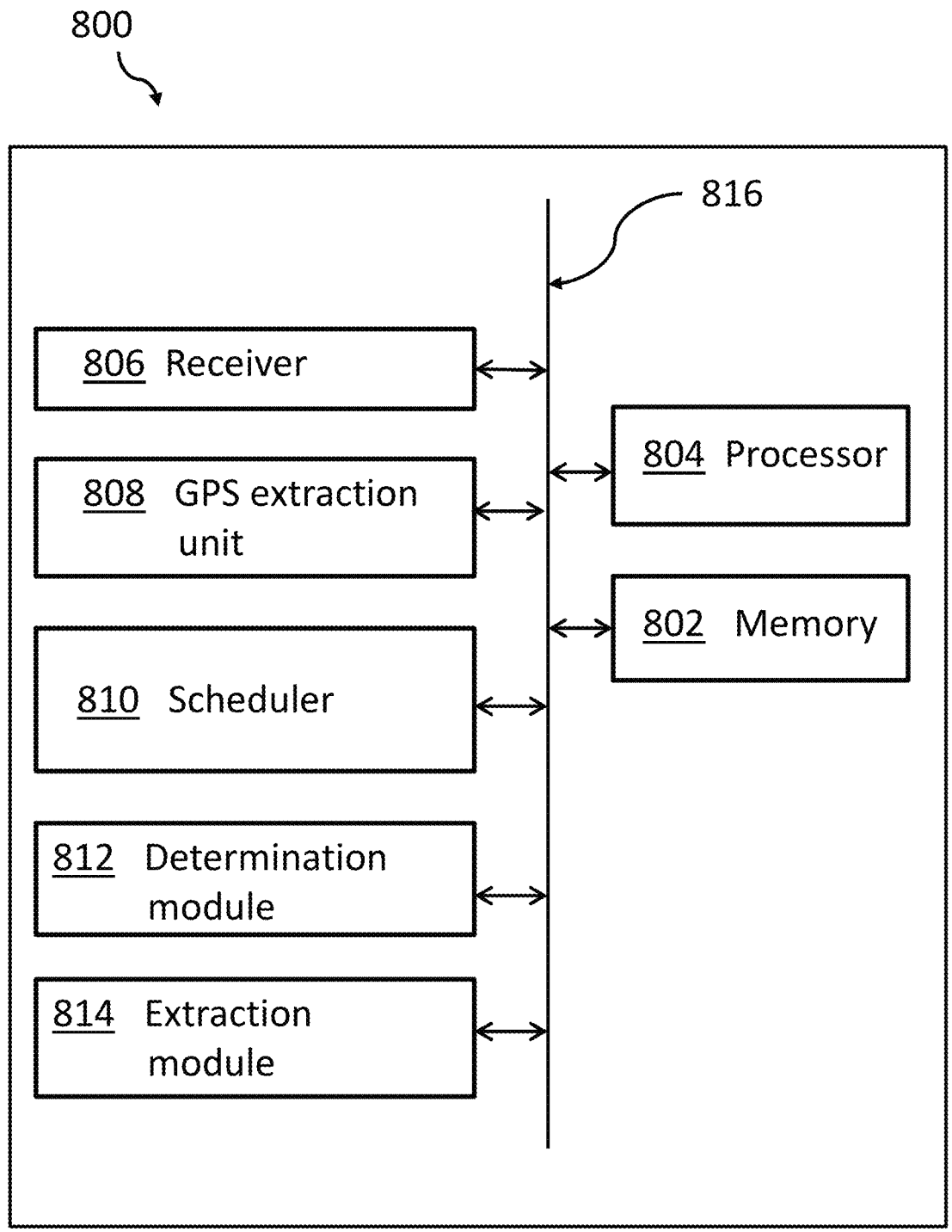
FIG. 8 depicts a block diagram of an embodiment of an image stitching system for image stitching for a plurality of digital images of an infrastructure surface for defect detection, in accordance with embodiments of the present disclosure.

FIG. 8 shows a schematic drawing of an illustrative embodiment of the image stitching system 800 for image stitching for a plurality of digital images of an infrastructure surface for defect detection. The system 800 comprises a memory 802 for storing program code portions. The memory 802 is coupled to a processor 804, which, when executing the program code portions, is enabled to receive a plurality of partial digital images of an infrastructure surface, extract global positioning system meta-data from the data of the partial digital images, and schedule a processing sequence for the images based on the extracted global positioning system meta-data. In accordance with at least some embodiments of the present disclosure, the processor 804 can use a receiver 806 to receive the plurality of partial digital images of the infrastructure surface. In accordance with at least some embodiments of the present disclosure, the processor 804 can use a GPS extraction unit 808 to extract the global positioning system meta-data from the partial digital images. In accordance with at least some embodiments of the present disclosure, the processor 804 can use a scheduler 810 to schedule the processing sequence for the images.

The processor 804 is also enabled, when executing the program code, to determine feature descriptions in the one or more partial digital images and execute the scheduled processing sequence, thereby determining an affinity matrix using the feature description of adjacent partial digital images to incrementally position each of the partial digital images. In this manner, a step-wise an overview image of the infrastructure surface is produced by digitally stitching the plurality of partial digital images together. In accordance with at least some embodiments of the present disclosure, the processor 804 can use a determination module 812 to determine the feature descriptions in the one or more partial digital images. In accordance with at least some embodiments of the present disclosure, the processor 804 can use an extraction module 814 to execute the scheduled processing sequence.

It will be appreciated that all functional units, modules, and functional blocks, such as the receiver 806, the GPS extraction unit 808, the scheduler 810, the determination module 812, and the extraction module 814, may be implemented as hardware units, software modules or a combination thereof, and that they can be communicatively coupled to each other for signal or message exchange in a selected 1:1 manner. Alternatively, the functional units, modules, and functional blocks can be linked to a system internal bus system 816 for a selective signal or message exchange.

Embodiments of the disclosure may be implemented together with virtually any type of computer, regardless of the platform, that is suitable for storing and/or executing program code. For example, FIG. 9 depicts an illustrative embodiment including a computing system 900 suitable for executing program code related to the method disclosed herein.

The computing system 900 is only one example of a suitable computer system and is not intended to suggest any limitation as to the scope of use or functionality of embodiments described herein. The illustrative computer system 900 is capable of being implemented and/or performing any of the functionality set forth hereinabove. In accordance with at least some embodiments of the present disclosure, the computer system 900 may be a server. In the computer system 900, there are components, which are operational with numerous other general-purpose or special purpose computing system environments or configurations. Examples of well-known computing systems, environments, and/or configurations that may be suitable for use with computer system 900 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 900 may be described in the general context of computer system-executable instructions, such as program modules, being executed by a computer system 900. Generally, program modules may include routines, programs, objects, components, logic, data structures, and so on that perform particular tasks or implement particular abstract data types. The computer system/server 900 may be practiced in distributed cloud computing environments where tasks are performed by remote processing devices that are linked through a communications network. In a distributed cloud computing environment, program modules may be located in both local and remote computer system storage media, including memory storage devices.

Figure 9:
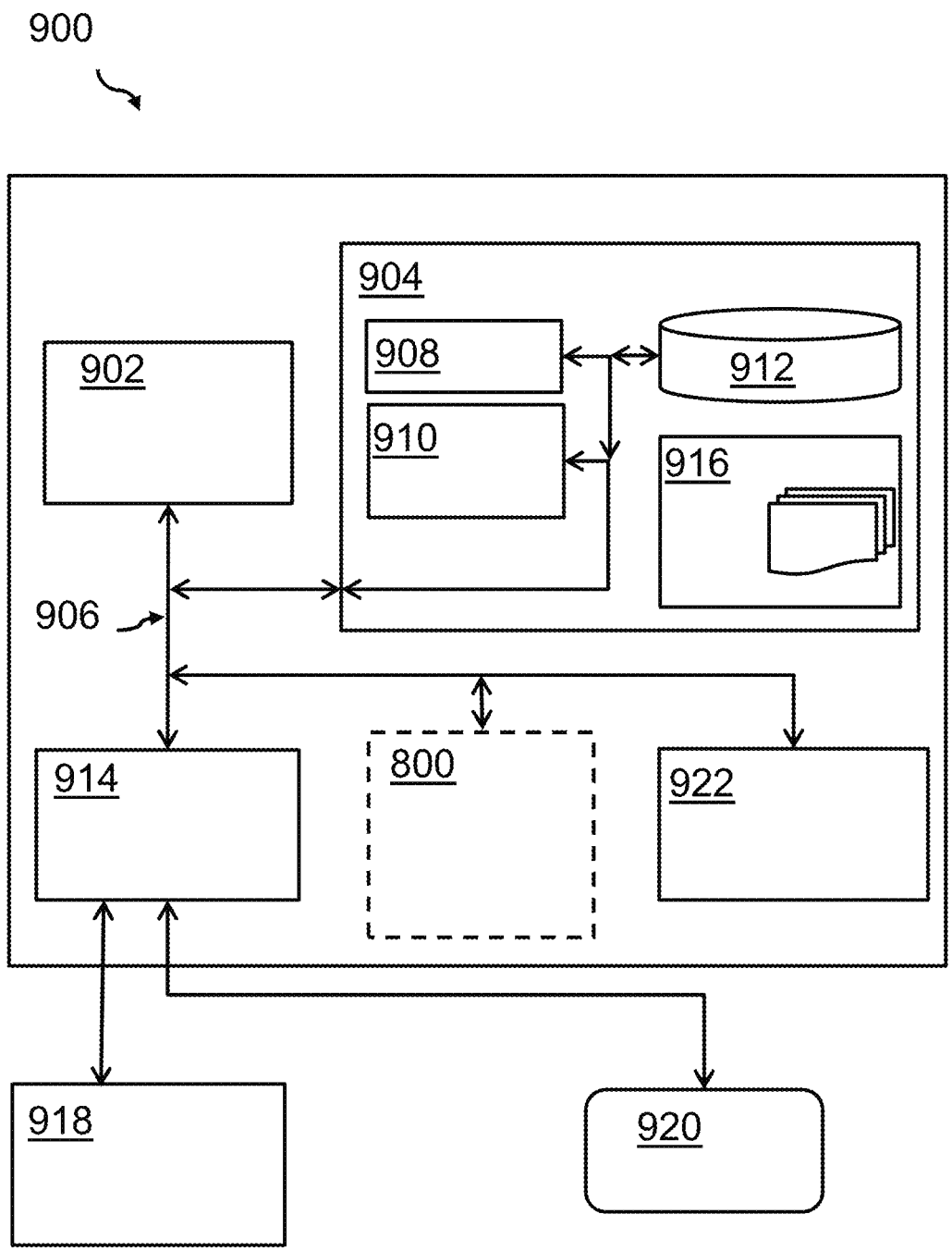
FIG. 9 depicts a schematic drawing of an embodiment of a computing system comprising the system according to FIG. 8, in accordance with embodiments of the present disclosure.

In the illustrative embodiment shown in FIG. 9, the computer system/server 900 is a general-purpose computing device. The components of computer system/server 900 may include, but are not limited to, one or more processors or processing units 902, a system memory 904, and a bus 906 that couples various system components including system memory 904 to the processor 902. The bus 906 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 900 typically includes a variety of computer system readable media. Such media may be any available media that is accessible by computer system/server 900, and it includes both, volatile and non-volatile media, removable and non-removable media.

The system memory 904 may include computer system readable media in the form of volatile memory, such as random access memory (RAM) 908 and/or cache memory 910. The computer system/server 900 may further include other removable/non-removable, volatile/non-volatile computer system storage media. By way of example only, a storage system 912 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to the bus 906 by one or more data media interfaces. As will be further depicted and described below, the system memory 904 may include at least one program product having a set (e.g., at least one) of program modules that are configured to carry out the functions of embodiments of the disclosure.

The program/utility, having a set (at least one) of program modules 916, may be stored in the memory 904 by way of non-limiting example, as well as an operating system, one or more application programs, other program modules, and program data. Each of the operating systems, one or more application programs, other program modules, and program data or some combination thereof, may include an implementation of a networking environment. The program modules 916 generally carry out the functions and/or methodologies of embodiments of the disclosure, as described herein.

The computer system/server 900 may also communicate with one or more external devices 918, such as a keyboard, a pointing device, a display 920, etc., one or more devices that enable a user to interact with computer system/server 900, and/or any devices (for example, network card, modem, etc.) that enable computer system/server 900 to communicate with one or more other computing devices. Such communication can occur via Input/Output (I/O) interfaces 914. The computer system/server 900 may also communicate with one or more networks such as a local area network (LAN), a general wide area network (WAN), and/or a public network (for example, the Internet) via a network adapter 922. As depicted, the network adapter 922 may communicate with the other components of the computer system/server 900 via the bus 906. It should be understood that, although not shown, other hardware and/or software components could be used in conjunction with the computer system/server 900. Examples, include, but are not limited to: microcode, device drivers, redundant processing units, external disk drive arrays, RAID systems, tape drives, and data archival storage systems, etc.

Additionally, the image stitching system 800 for image stitching for a plurality of digital images of an infrastructures surface for defect detection may be attached to the bus system 906.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to limit the disclosure. As used herein, the singular forms a, an, and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the disclosure in the form disclosed. Many modifications and variations will be apparent to those of ordinary skills in the art without departing from the scope and spirit of the disclosure. The embodiments are chosen and described in order to best explain the principles of the disclosure and the practical application, and to enable others of ordinary skills in the art to understand the disclosure for various embodiments with various modifications, as are suited to the particular use contemplated.

In summary, some aspects of the present disclosure may be illustrated using the following non-limiting list of example embodiments.

Example embodiment 1 is a computer-implemented method for image stitching for a plurality of digital images of an infrastructure surface for defect detection. The method including providing a plurality of partial digital images of an infrastructure surface. The method further including extracting global positioning system meta-data from the data of the partial digital images. The method further including scheduling a processing sequence for the partial digital images based on the extracted global positioning system meta-data. The method further including determining feature descriptions in the one or more partial digital images. The method further including executing the scheduled processing sequence and thereby determining an affinity matrix using the feature description of adjacent partial digital images to incrementally position each of the partial digital images, thereby producing step-wise an overview image of the infrastructure surface by digitally stitching the plurality of partial digital images together.

Example embodiment 2 includes the method of embodiment 1, including or excluding optional features. In this example embodiment, the method also includes rendering the overview image and mapping an identified defect, an annotation, or a measurement into the overview image.

Example embodiment 3 includes the method of any one of example embodiments 1 or 2, including or excluding optional features. In this example embodiment, the method also includes performing at least one activity selected out of the group comprising scene registration, image warping, and pixel-use comparisons for a time-evolution assessment, for a plurality of partial digital images of the infrastructure surface having different timestamps.

Example embodiment 4 includes the method of any one of example embodiments 1 through 3, including or excluding optional features. In this example embodiment, the method also includes generating the plurality of partial digital images using a camera of an unmanned, uninhabited vehicle.

Example embodiment 5 includes the method of any one of example embodiments 1 through 4, including or excluding optional features. In this example embodiment, determining feature descriptions uses a SIFT method.

Example embodiment 6 includes the method of any one of example embodiments 1 through 5, including or excluding optional features. In this example embodiment, determining feature descriptions includes detecting a point of interest.

Example embodiment 7 includes the method of any one of example embodiments 1 through 6, including or excluding optional features. In this example embodiment, determining the affinity matrix includes using a RANSAC method for incrementally positioning each of the partial digital images.

Example embodiment 8 includes the method of example embodiment 7, including or excluding optional features. In this example embodiment, incrementally positioning each of the partial digital images includes determining a transformation matrix $H_i$ to stitch a current partial digital image $I_i$ to an already existing intermediate stitched image $S_i$.

Example embodiment 9 includes the method of any one of example embodiments 1 through 8, including or excluding optional features. In this example embodiment, scheduling a processing sequence for the images includes sorting the partial digital images with an increasing distance from a central image of the infrastructure surface, and starting the incrementally positioning of each of the partial digital images from the central image.

Example embodiment 10 includes the method of any one of example embodiments 1 through 9, including or excluding optional features. In this example embodiment, providing the plurality of partial digital images includes capturing the partial digital images in parallel to the infrastructure surface.

Example embodiment 11 includes the method of any one of example embodiments 1 through 10, including or excluding optional features. In this example embodiment, providing the plurality of partial digital images includes capturing the partial digital images such that the image plan is not in parallel to a captured surface, and digitally de-skewing the partial digital image so as to parallel align the partial digital image to the captured surface.

Example embodiment 12 includes the method of any one of example embodiments 1 through 11, including or excluding optional features. In this example embodiment, providing the plurality of partial digital images includes capturing the partial digital images on a regular grid of the infrastructure surface.

Example embodiment 13 is an image stitching system for image stitching for a plurality of digital images of an infrastructure surface for defect detection. The system includes a memory for storing program code portions. The memory is coupled to a processor, which, when executing the program code portions, is enabled to receive a plurality of partial digital images of an infrastructure surface. The processor, when executing the program code portions, is further enabled to extract global positioning system meta-data from the data of the partial digital images. The processor, when executing the program code portions, is further enabled to schedule a processing sequence for the images based on the extracted global positioning system meta-data. The processor, when executing the program code portions, is further enabled to determine feature descriptions in the one or more partial digital images. The processor, when executing the program code portions, is further enabled to execute the scheduled processing sequence and thereby determining an affinity matrix using the feature description of adjacent partial digital images to incrementally position each of the partial digital images, thereby producing step-wise an overview image of the infrastructure surface by digitally stitching the plurality of partial digital images together.

Example embodiment 14 includes the system of example embodiment 13, including or excluding optional features. In this example embodiment, the processor, when executing the program code portions, is also enabled to render the overview image and map an identified defect, an annotation, or a measurement into the overview image.

Example embodiment 15 includes the system of any one of example embodiments 13 or 14, including or excluding optional features. In this example embodiment, the processor, when executing the program code portions, is also enabled to perform at least one activity selected out of the group comprising scene registration, image warping, and pixel-use comparisons for a time-evolution assessment for a plurality of partial digital images of the infrastructure surface having different timestamps.

Example embodiment 16 includes the system of any one of example embodiments 13 through 15, including or excluding optional features. In this example embodiment, the plurality of partial digital images is captured by a camera of an unmanned, uninhabited vehicle.

Example embodiment 17 includes the system of any one of example embodiments 13 through 15, including or excluding optional features. In this example embodiment, the processor, when executing the program code portions, is also enabled, when performing the determining feature descriptions, to detect a point of interest.

Example embodiment 18 includes the system of any one of example embodiments 13 through 17, including or excluding optional features. In this example embodiment, the processor, when executing the program code portions, is also enabled, when determining the affinity matrix, to execute a RANSAC method for incrementally positioning each of the partial digital images.

Example embodiment 19 includes the system of example embodiment 13, including or excluding optional features. In this example embodiment, the processor, when executing the program code portions, is also enabled, when providing the partial digital images, to capture the partial digital images such that the image plan is not in parallel to a captured surface, and digitally de-skew the partial digital image so as to align in parallel the partial digital image to the captures surface.

Example embodiment 20 includes a computer program product for image stitching for a plurality of digital images of an infrastructures surface for defect detection. The computer program product includes a computer readable storage medium having program instructions embodied therewith. The program instructions are executable by one or more computing systems or controllers to cause the one or more computing systems to receive a plurality of partial digital images of an infrastructure surface. The program instructions are executable to cause the one or more computing systems to extract global positioning system meta-data from the data of the partial digital images. The program instructions are executable to cause the one or more computing systems to schedule a processing sequence for the images based on the extracted global positioning system meta-data. The program instructions are executable to cause the one or more computing systems to determine feature descriptions in the one or more partial digital images. The program instructions are executable to cause the one or more computing systems to execute the scheduled processing sequence and thereby determine an affinity matrix using the feature description of adjacent partial digital images to incrementally position each of the partial digital images, thereby producing step-wise an overview image of the infrastructure surface by digitally stitching the plurality of partial digital images together.

What is claimed is:

1. A computer-implemented method for image stitching for a plurality of digital images of an infrastructure surface for defect detection, the method comprising:
    providing a plurality of partial digital images of an infrastructure surface, the plurality of partial digital images captured in a capture sequence;
    extracting global positioning system meta-data from data corresponding to the partial digital images;
    generating a chart for the plurality of partial digital images, wherein each partial digital image is represented by a dot on the chart, and wherein the dots are organized on the chart in a manner that represents relative positions for the plurality of partial digital images;
    sorting the plurality of partial digital images according to an increasing geometrical distance from a central image determined to be at the center of an overview image;
    labelling the dots on the chart with numbers indicating the sequence of stitching process based on the sorting for the plurality of partial digital images;
    defining a scheduled processing sequence for processing the partial digital images based on the chart and the extracted global positioning system meta-data;
    determining feature descriptions of features in the plurality of partial digital images;
    executing the scheduled processing sequence for the partial digital images to determine an affinity matrix using the feature descriptions of adjacent partial digital images;
    incrementally positioning each of the partial digital images based on the affinity matrix, wherein incrementally positioning each of the partial digital images includes determining a transformation to apply to a respective partial digital image and wherein determining the transformation includes discarding the transformation if it exceeds a threshold value; and iteratively digitally stitching the positioned partial digital images together to produce an overview image of the infrastructure surface, the positioned partial digital images stitched in a stitching sequence, wherein the stitching sequence is different than the capture sequence.

2. The method according to claim 1, further comprising: rendering the overview image; and mapping at least one of an identified defect, annotation, or measurement onto the overview image.

3. The method according to claim 1, wherein determining the affinity matrix further includes using a RANSAC method to incrementally position each of the partial digital images.

4. The method according to claim 3, wherein incrementally positioning each of the partial digital images includes determining a transformation matrix $H_i$ to stitch a current partial digital image $I_i$ to an already existing intermediate stitched image $S_i$.

5. The method according to claim 1, further comprising: scheduling the processing sequence for the images, including sorting the partial digital images with an increasing distance from a central image of the infrastructure surface, wherein:

each of the partial digital images is positioned based on the central image.

6. The method according to claim 1, wherein providing the partial digital images includes capturing the partial digital images at an angle approximately parallel to the infrastructure surface.

7. The method according to claim 1, wherein providing the partial digital images includes:

capturing the partial digital images such that the image plan is not parallel to a captured surface, and digitally de-skewing the partial digital image to align the partial digital image in parallel with the captured surface.

8. The method according to claim 1, wherein providing the partial digital images includes capturing the partial digital images on a regular grid of the infrastructure surface.

9. An image stitching system for image stitching for a plurality of digital images of an infrastructure surface for defect detection, the system comprising:

a memory for storing program code portions, the memory being coupled to a processor, which, when executing the program code portions enables the processor to:

receive a plurality of partial digital images of an infrastructure surface, the plurality of partial digital images captured in a capture sequence;

extract global positioning system meta-data from data corresponding to the partial digital images;

generate a chart for the plurality of partial digital images, wherein each partial digital image is represented by a dot on the chart, and wherein the dots are organized on the chart in a manner that represents relative positions for the plurality of partial digital images;

sort the plurality of partial digital images according to an increasing geometrical distance from a central image determined to be at the center of an overview image;

label the dots on the chart with numbers indicating the sequence of stitching process based on the sorting for the plurality of partial digital images;

define a scheduled processing sequence for processing the partial digital images based on the chart and the extracted global positioning system meta-data;

determine feature descriptions of features in the plurality of partial digital images;

execute the scheduled processing sequence for the plurality of partial digital images to determine an affinity matrix using the feature descriptions of adjacent partial digital images;

incrementally position each of the partial digital images based on the affinity matrix, wherein incrementally positioning each of the partial digital images includes determining a transformation to apply to a respective partial digital image and wherein determining the transformation includes discarding the transformation if it exceeds a threshold value; and iteratively digitally stitch the positioned partial digital images together to produce an overview image of the infrastructure surface, the positioned partial digital images stitched in a stitching sequence, wherein the stitching sequence is different than the capture sequence.

10. The system according to claim 9, wherein the processor, when executing the program code portions, is also enabled to render the overview image and map an identified defect, annotation, or measurement onto the overview image.

11. The system according to claim 9, wherein the processor, when executing the program code portions, is also enabled, when determining the affinity matrix, to execute a RANSAC method for incrementally positioning each of the partial digital images.

12. The system according to claim 9, wherein the processor, when executing the program code portions, is also enabled, when providing the partial digital images, to capture each partial digital image such that the image plan is not in parallel to a captured surface, and digitally de-skew each partial digital image so as to align the partial digital image parallel to the captured surface.

13. A computer program product for image stitching for a plurality of digital images of an infrastructures surface for defect detection, the computer program product comprising a computer readable storage medium having program instructions embodied therewith, the program instructions being executable by one or more computing systems or controllers to cause said one or more computing systems to:

receive a plurality of partial digital images of an infrastructure surface, the plurality of partial digital images captured in a capture sequence;

extract global positioning system meta-data from data corresponding to the partial digital images;

generate a chart for the plurality of partial digital images, wherein each partial digital image is represented by a dot on the chart, and wherein the dots are organized on the chart in a manner that represents relative positions for the plurality of partial digital images;

sort the plurality of partial digital images according to an increasing geometrical distance from a central image determined to be at the center of an overview image;

label the dots on the chart with numbers indicating the sequence of stitching process based on the sorting for the plurality of partial digital images;

define a scheduled processing sequence for processing the partial digital images based on the chart and the extracted global positioning system meta-data;
determine feature descriptions of features in the plurality of partial digital images;
execute the scheduled processing sequence for the plurality of partial digital images to determine an affinity matrix using the feature descriptions of adjacent partial digital images;
incrementally position each of the partial digital images based on the affinity matrix, wherein incrementally positioning each of the partial digital images includes determining a transformation to apply to a respective partial digital image and wherein determining the transformation includes discarding the transformation if it exceeds a threshold value; and
iteratively digitally stitch the positioned partial digital images together to produce an overview image of the infrastructure surface, the positioned partial digital images stitched in a stitching sequence, wherein the stitching sequence is different than the capture sequence.

14. The method according to claim 1, wherein the chart is oriented such that relative longitudinal position is on x-axis and relative latitudinal position is on y-axis.

15. The system according to claim 9, wherein the chart is oriented such that relative longitudinal position is on x-axis and relative latitudinal position is on y-axis.

16. The computer program product of claim 13, wherein the chart oriented such that relative longitudinal position is on x-axis and relative latitudinal position is on y-axis.

17. The method according to claim 1, further comprising:
connecting the dots on the chart by a line, wherein the line indicates the sequence in which the plurality of partial digital images are captured.

18. The system according to claim 9, wherein the processor, when executing the program code portions, is also enabled to:
connect the dots on the chart by a line, wherein the line indicates the sequence in which the plurality of partial digital images are captured.

19. A The computer program product of claim 13, wherein the program instructions being executable by one or more computing systems or controllers further cause said one or more computing systems to: connect the dots on the chart by a line, wherein the line indicates the sequence in which the plurality of partial digital images are captured.

20. The computer program product of claim 13, wherein the program instructions being executable by one or more computing systems or controllers further cause said one or more computing systems to: render the overview image; and map at least one of an identified defect, annotation, or measurement onto the overview image.

* * * * *